United States Patent Office 2,917,513
Patented Dec. 15, 1959

2,917,513

METHOD OF MAKING FORMAMIDO-AMINO URACILS

Frederick C. Ernest, Brentwood, and Harold Raffelson, Olivette, Mo., assignors to Monsanto Chemical Company, St. Louis, Mo., a corporation of Delaware No Drawing. Application September 5, 1958
Serial No. 759,121

9 Claims. (Cl. 260—256.4)

This invention relates to the preparation of caffeine and theophylline intermediates and, more particularly, to an improved process for formylating 4,5-diaminouracil or the acid salts thereof.

In the synthesis of purines such as xanthine, caffeine, theobromine, and theophylline, among others, it has been the proved practice to prepare a 6-membered heterocyclic compound containing an amino group attached to each of two adjacent ring carbon atoms. In a subsequent step, the diamine has been reacted with formic acid to prepare a heterocyclic compound having a formamido and an amino group attached to two adjacent ring carbon atoms. The formamido-amino substituted heterocyclic compound has been subjected to conditions promoting ring closure whereby, through the splitting out of water involving the hydrogens of the amino group and the oxygen of the formamido group, ring closure occurs. By employing this general procedure there has been prepared purines containing the structure

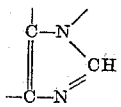

wherein the two adjacent carbon atoms are also members of a 6-membered heterocyclic ring.

The general process described above has been successfully employed in the synthesis of the stimulants, caffeine, theobromine, and theophylline and have been employed in the synthesis of other similar purines, all of which have the following formula:

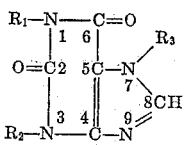

wherein each of the R groups can be either hydrogen or an alkyl group. In the preparation of these purines, a formamido-amino uracil is subjected to conditions promoting ring closure, the formamido-amino uracil intermediate having been prepared by the formylation of a diaminouracil.

Several methods have been proposed for the preparation of the formamido-amino uracil employed as an intermediate in the synthesis of purines. One method previously suggested involves the reaction of the diaminouracil as a free base with concentrated formic acid. Another process employs an acid salt of the diaminouracil with concentrated formic acid together with sodium formate and sulfuric acid. In this process, the formic acid employed is of about 50 to about 90% by weight formic acid with the remainder being water. Still another process for the formylation of the diaminouracil employs dilute aqueous formic acid compositions containing from about 2% to about 40% by weight of formic acid. In the processes which employ concentrated formic acid, it is suggested that a substantial excess of formic acid be used, i.e., from 10 to 30 equivalents of formic acid per equivalent of the diaminouracil. In the processes suggesting the use of dilute aqueous formic acid solutions, it is recommended that there be employed an amount of formic acid more nearly equivalent to the theoretical amount required for formulation, that being in the range of 1 to 5 equivalents of formic acid per equivalent of the diaminouracil.

In general, the above prior processes otherwise employed the same reaction conditions, that is, the 4,5-diaminouracil and formic acid were combined and the resulting mixture heated to its boiling point and maintained under reflux conditions. One of the drawbacks of the use of concentrated formic acid was the use of such large quantities of excess formic acid which, of course, had to be recovered for subsequent use. Although the use of dilute formic acid eliminated the need to recover and purify formic acid for subsequent use, a drawback of the process using dilute formic acid was that it did not provide a formamido-amino uracil of high quality. These variations in the formylation of the 4,5-diaminouracil were made to overcome the formation of off-colored formamido-aminouracil products. These products varied in color from a green to yellow at best. Also, these products were amorphous products rather than crystalline products. It was obviously the thought in developing these prior processes that the use of the large volumes of liquid in the reaction medium in the form of a great excess of concentrated formic acid or in the form of dilute aqueous formic acid solutions would remove or somehow prevent the formation of colored formamido-aminouracil products and also provide for the formation of a crystalline product. In laboratory processes or in industrial processes, a solid formamido-aminouracil product having particles of very small size results, however, these particles do not have the form or properties of crystals and this product more nearly resembles an amorphous material. Obviously, such a finely-divided product is difficult to recover from the reaction medium.

There have been attempts to provide processes which eliminated the separate recovery of the 4,5-diaminouracils. However, these suggested processes have added other complicating reaction conditions and recovery and separation of materials.

However, it has now been discovered that formamido-aminouracil can be prepared in high yields as substantially white, crystalline materials by reacting 4,5-diaminouracil with a formic acid formylating agent at lower temperatures than have heretofore been employed. These lower temperatures are in the range of from 40° to below about 80° C. These temperatures, in contrast to those recommended by the prior art process as being "at least 80° C." and as preferably reflux temperatures and temperatures above the boiling point of the reaction mixture, are indeed lower reaction temperatures. As would be expected, the formylation reaction at the lower temperatures from about 40° to below about 80° C. proceeds at a lower reaction rate. However, such lower reaction rates are not a disadvantage because, not only does this process produce a white crystalline product, but also this process produces a higher yield than has been obtainable from the prior higher temperature processes. Furthermore, the formamido-aminouracil also produced by the process of the invention can be used directly in the preparation of the purine rather than being first subjected to a lengthy and somewhat complicated purification process. The formamido-aminouracil when prepared from the 4,5-diaminouracil can be converted to any of the alkyl substituted xanthines depending upon the sequence of the final steps, the ring closure and the alkylation. If the alkylation, specifically the methylation, takes place prior to the ring closure, theophylline (1,3-dimethyl xanthine) is prepared. If caffeine is desired, the ring closure will precede the alkylation step and the subsequent alkylation, in this case methylation, will be conducted as to substitute three methyl groups, thereby forming the 1,3,7-trimethyl xanthine. Theobromine (3,7-dimethyl xanthine) may also be prepared by first closing the ring followed by a partial methylation to a lesser extent.

In general, the process of this invention comprises combining a formic acid formylating agent, such as concentrated formic acid or dilute aqueous formic acid, a formic acid ester or a salt of formic acid, with 4,5-diaminouracil and heating this mixture at a temperature of above 40° C. but below 80° C. Preferably the formylation is carried out in an aqueous reaction medium and it is also preferred that at least an initial portion of the formylation is carried out at a temperature not in excess of about 50 to 55° C. A more preferred preparation according to this invention comprises combining a formic acid formylating agent and an aqueous solution of the diamino reactant, carrying out the initial portion of the reaction for a short time at about 50 to 55° C., about 2 to 5 hours, and then increasing the reaction temperature to about 60 to 75° C. and maintaining this higher reaction temperature until the formylation process has been completed. Of course, the entire formylation reaction can be carried out at one temperature, say 50° C., if desired. However, it has been found that if the latter part of the reaction is carried out at a temperature above the initial portion of the reaction for a time about twice that of the time at the lower reaction temperature, a more efficient process will result. However, such a time relationship is only in the interest of economical use of reaction equipment and does not appear to be critical to the process of this invention. It is critical to the process of the invention, however, that at least the initial portion thereof be carried out at a temperature not in excess of about 55° C. and preferably a temperature of 45 to 50° C., and that the remainder of the reaction be carried out at a temperature below 80° C. and preferably 75° C. and below to about 60° C.

When the synthesis of 4,5-diaminouracil takes place at lower temperatures, the conditions are such as to favor the formation of crystalline products which are of exceptional purity and desirable crystal size. After more than half of the product has crystallized in the reaction medium, the temperature may be increased, which change of operating conditions is not necessary for the production of the desired product, but it is advantageous in the acceleration of the reaction rates during the final steps. After most or preferably substantially all of the product has been precipitated, the minor or slight amount of product forming will deposit on the crystal nuclei already in existence and the undesirable amorphous product with its incident discoloration will be avoided. These advantages are observed in the preparation of 4,5-diaminouracil and especially when extraneous reactants are excluded.

In the process of this invention there can be employed formic acid of a concentration in the reaction medium as low as about 2% by weight up to 90% by weight. There also can be used a quantity of formic acid up to 30 equivalents or more per equivalent of the 4,5-diaminouracil. Obviously, for the sake of efficient use of reactor volumes and to maintain the recovery of unreacted materials at a minimum, the amount of formic acid employed can be that amount which will provide for efficient stirring of the reaction slurry as well as the slurry of the reaction product. An amount of formic acid which will provide up to 5.0 moles of formic acid per mole of 4,5-diaminouracil can be advantageously used. To provide this amount of formic acid, dilute aqueous formic acid of a concentration as low as about 2% by weight formic acid can be employed with solid 4,5-diaminouracil and more concentrated formic acid, 85% to 100% formic, can be used with dilute aqueous solutions of 4,5-diaminouracil. Also, these amounts of formic acid can be provided as formic acid formed in situ by the reaction of a mineral acid, such as hydrochloric acid, on a salt of formic acid, such as sodium, potassium, ammonium, calcium, etc., water-soluble formates or by the liberation of formic acid by the reaction of an acid salt of 4,5-diaminouracil on a salt of formic acid, such as sodium formate. Formic acid can also be provided through an ester of formic acid by alkaline and/or acid hydrolysis of the ester. As will hereinafter be described, this can be readily accomplished in situ. The expression "formic acid formylating agent" as used herein in the specification and claims is intended to include not only formic acid itself but also those combinations of reagents described herein which yield formic acid in the reaction medium.

In a specific embodiment of the invention, 4,5-diaminouracil is heated with formic acid in aqueous solution at a temperature of from 45 to 50° C. for 2 to 5 hours and then reacted at 65 to 70° C. for about 4 to 6 hours. The resulting formamido-aminouracil is thereafter recovered from the reaction mixture.

In another embodiment, one equivalent of the acid salt of the diaminouracil is employed together with formic acid and part of the formic acid being replaced with sodium formate. For example, one equivalent of 4,5-diaminouracil hydrochloride is heated in the presence of an aqueous solution containing sodium formate and formic acid at a temperature of about 45° to 50° C. for the initial period of the reaction and thereafter heated at a temperature below 80° C., that is, about 60° to 75° C. for the remainder of the reaction.

The reactants may be mixed at the initial reaction temperature or they may be combined at a temperature below the initial reaction temperature and then heated to a temperature within the initial reaction temperature range as hereinbefore set forth.

The following examples are intended to illustrate the improved process of the invention and are not intended as a limitation thereon. The term "parts" is employed in these examples to indicate parts by weight.

*Example 1*

A glass reactor is purged free of oxygen with a nitrogen-hydrogen gas mixture and there is charged to the reactor 2.5 parts of zinc and 722 parts of an alkaline aqueous solution containing 54 parts 4,5-diaminouracil. The pH of the resulting mixture is adjusted to about 4.5 by the addition of about 69 parts of 18° Bé. hydrochloric acid. To this acidic mixture there is added about 59 parts of 85% formic acid and the resulting mixture is stirred and heated to 50° C. and maintained at about 50° C. for three hours. Thereafter, the reaction temperature is increased to 70° C. and there maintained for 6 hours. Then the resulting mixture is cooled to about 5° C., is filtered and the recovered white crystals are washed with 200 ml. cold (5° C.) water. The recovered crystalline material is dried. There is recovered about 56 parts, a yield of 88% of dry white sparkling arrow-shaped crystalline 4-amino-5-formamidouracil.

Example II

A reaction vessel containing 5 parts of powdered zinc is purged free of air with a mixture of nitrogen and hydrogen and then charged with 718 parts of an aqueous alkaline solution containing 46.6 parts of 4,5-diaminouracil. The aqueous solution is made acidic, pH of about 4.5, by the addition of 61.2 parts of 18° Bé. hydrochloric acid with stirring. To the acidic reaction medium there is added about 52 parts of 85.6% formic acid, and the resulting mixture is stirred and heated to 51° C. and there maintained for 26 hours. The resulting mixture is cooled to 5° C., filtered, the white crystals recovered are washed with 200 parts of cold water, and the washed crystals are dried. The white, dry crystalline 4-amino-5-formamidouracil is recovered in a yield of about 51 parts, a 91% yield.

Example III

A reaction vessel containing 2.5 parts of zinc dust is purged free of air with a gaseous mixture of nitrogen and hydrogen. To this reaction vessel there are added 658 parts of an alkaline aqueous solution containing 46.8 parts of 4,5-diaminouracil. The resulting mixture is stirred and heated to 45° C. and 67 parts of methyl formate are added over a 60-minute period below the surface of the reaction medium. Thereafter, 67 parts of hydrochloric acid (31% HCl) are added and the reaction temperature increased to 50° C. and there maintained for about five hours. The reaction mixture is heated to 70° C. and held at that tempearture for about four hours. The resulting mixture is then cooled to 5° C. and filtered. The recovered solid product is washed with cold water and dried. A yield of dry, white 4-amino-5-formamidouracil. a 91% yield, is recovered.

Example IV

There is added to a reaction vessel purged free from oxygen with a gaseous mixture of nitrogen and hydrogen, 5 parts of zinc dust, 732 parts of an alkaline aqueous solution containing about 78 parts of 4,5-diaminouracil, and 270 parts of hydrochloric acid (31% HCl). This mixture is heated with stirring to 50° C. and 105 parts of sodium formate dissolved in 200 parts of water are added over a 15-minute period. The temperature of the reaction mixture is maintained at 50° C. for 3 hours, is then increased to 70° C. and there held for 6 hours. The resulting mixture is cooled to 5° C. and filtered. The recovered solid product is washed with cold water and dried. There is recovered 82 parts, an 88% yield, of dry, white 4-amino-5-formamidouracil.

Example V 4-amino-5-formamidouracil can also be prepared by employing cyclohexyl formate as the formylating agent. Such a process can be carried out by combining 461 parts of an alkaline solution containing 54 parts of 4,5-diaminouracil and 165 parts of cyclohexyl formate. The resulting mixture is heated to about 50° C., with stirring, and maintained at this temperature for about 3 hours. Thereafter there is added to the reaction mixture about 74 parts of hydrochloric acid (30% HCl) and the resulting mixture is cooled to a temperature from about 0° to 5° C., with stirring, and the crystalline product which forms is recovered and washed with cold water. By following this procedure a yield of the desired product in excess of 80% of theory can be obtained.

In the processes described above, the zinc was employed to liberate hydrogen by reaction with the mineral acid, hydrochloric acid, and thereby maintain an oxygen-free reaction medium throughout the formylation step. Also, in the process of Example III, a portion of the methyl formate hydrolyzed in the alkaline aqueous solution during the slow addition of the ester. The remainder of the ester hydrolyzes under the acidic conditions after the addition of the hydrochloric acid.

As hereinbefore stated, any salt of formic acid, and preferably any water-soluble formic acid salt, and more preferably any water-soluble formic acid salt having a water-soluble mineral acid derivative formed by reaction with the mineral acid in the reaction medium, can be used in a formylation process as illustrated in Example IV. Thus, when the mineral acid employed is hydrochloric acid, such alkaline earth metal formates as calcium and barium formates can be employed in addition to the alkali metal formates such as sodium and potassium formates. Likewise, esters other than methyl formate can be employed in the process of this invention. Obviously, for the sake of keeping the process simple, an ester which is derived from a water-miscible alcohol will be most satisfactory. However, insofar as the formylation reaction is concerned, any ester which will, through hydrolysis, yield formic acid and an alcohol under these conditions of the formylation reaction, that is, under 80° C., will be useful, since it is the formic acid liberated under the reactions and not the alcohol also liberated which enters into the formylation reaction.

The process of this invention has been disclosed broadly as utilizing a mineral acid and hydrochloric acid has been employed to illustrate the use of a mineral acid. Although sulfuric, phosphoric, hydrochloric, among other mineral acids, can be employed, hydrochloric acid is the preferred acid because its use provides the most efficient process.

While the process of this invention has been illustrated by means of specific examples wherein precise preparations and reaction conditions were employed, it is not desired or intended that the scope of this invention be limited thereto, for other modifications within the skill of the art and the spirit of this invention will be obvious to those skilled in the art. Hence, it is intended that this invention be limited only by the appended claims.

This application is a continuation-in-part of application Serial Number 599,336, filed July 23, 1956, of Frederick C. Ernest et al., now abandoned.

What is claimed is:

1. In the process of preparing 4-amino-5-formamidouracil by heating 4,5-diaminouracil in the presence of a formic acid formylating agent at a temperature below 80° C., the step comprising conducting at least the first half of the preparation below 55° C.

2. The process of preparing 4-amino-5-formamidouracil which comprises reacting 4,5-diaminouracil with a formic acid formylating agent at a temperature below 80° C., the reaction being carried out below 55° C. until it is at least 50 percent complete and separating the resulting crystalline 4-amino-5-formamidouracil.

3. In the process of preparing 4-amino-5-formamidouracil by heating 4,5-diaminouracil in the presence of a formic acid formylating agent at a temperature below 80° C., the steps of conducting at least the first half of the reaction at a temperature of 40° C. to 55° C. and completing the reaction at a temperature above 55° C. but below 80° C.

4. The process of preparing 4-amino-5-formamidouracil which comprises heating 4,5-diaminouracil with a formic acid salt in an aqueous acidic medium at a temperature of 40° C. to 55° C. until the reaction is at least 50% complete, increasing the temperature to between 55° C. and 80° C., and separating the resulting crystalline 4-amino-5-formamidouracil.

5. The process of claim 4 wherein the formic acid salt is sodium formate and the acidic medium is provided by hydrochloric acid.

6. The process of preparing 4-amino-5-formamidouracil which comprises heating 4,5-diaminouracil with an ester of formic acid under hydrolysis conditions at a temperature of 40° C. to 55° C. until the reaction is at least 50% complete, increasing the temperature to between 55° C. and 80° C., and separating the resulting crystalline 4-amino-5-formamidouracil.

7. The process of claim 6 wherein the formic acid ester is methyl formate and the hydrolysis conditions are established by the addition of hydrochloric acid.

8. The process for the preparation of 4-amino-5-formamidouracil which comprises heating a reaction mixture comprising a 4,5-diaminouracil mineral acid salt, formic acid and an alkali metal formate at a temperature of 40° C. to 50° C. until the reaction is at least 50% complete, increasing the temperature to between 55° C. and 80° C. and separating the resulting 4-amino-5-formamidouracil.

9. The process of claim 8 wherein the mineral acid salt is the hydrochloride salt and the alkali metal formate is sodium formate.

References Cited in the file of this patent

UNITED STATES PATENTS

| | | |
|---|---|---|
| 2,655,501 | Weinkauff | Oct. 13, 1953 |
| 2,785,163 | Swidinsky | Mar. 12, 1957 |